Apr. 17, 1923.
M. CULBERTSON
1,452,417
SEEDER BOOT AND SHOE
Original Filed July 20, 1920
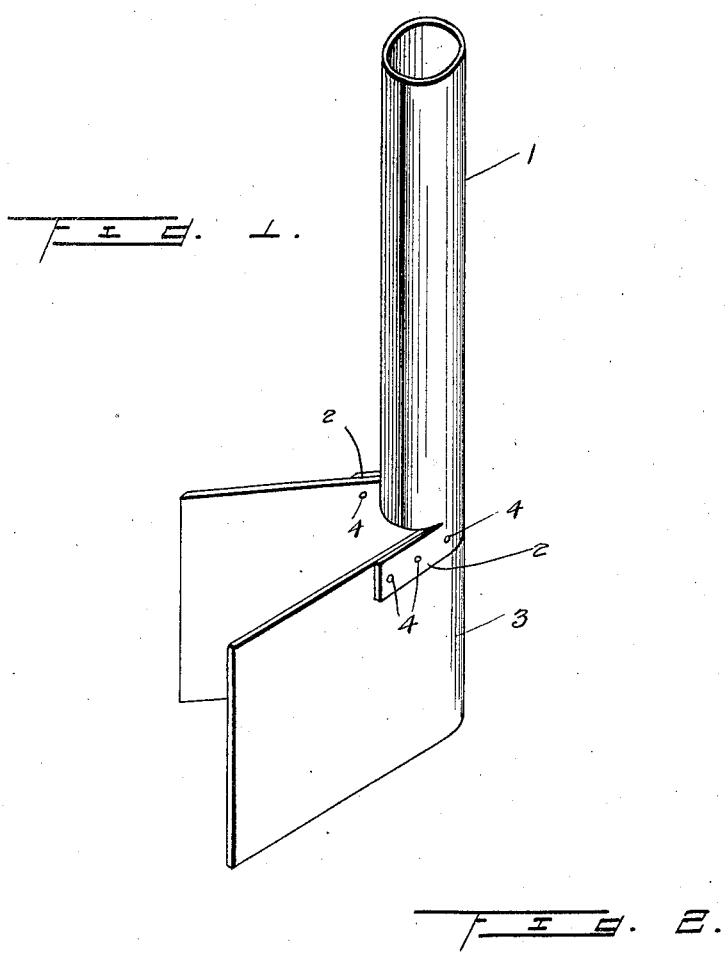
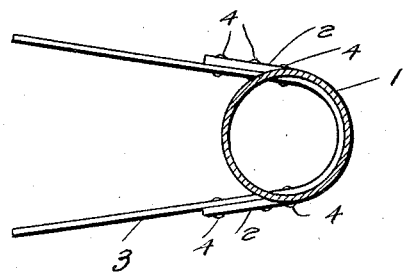
Inventor
M. Culbertson.

Patented Apr. 17, 1923.

1,452,417

UNITED STATES PATENT OFFICE.

MOSES CULBERTSON, OF KELFIELD, SASKATCHEWAN, CANADA.

SEEDER BOOT AND SHOE.

Application filed July 20, 1920, Serial No. 397,721. Renewed July 13, 1922. Serial No. 574,823.

*To all whom it may concern:*

Be it known that I, MOSES CULBERTSON, a subject of the King of Great Britain, residing at Kelfield, in the Province of Saskatchewan and Dominion of Canada, have invented certain new and useful Improvements in a Seeder Boot and Shoe; and I do hereby declare the following to be a full, clear, and exact description of the invention, such as will enable others skilled in the art to which it appertains to make and use the same.

This invention relates to a combined boot and shoe especially adapted to be used upon seeding machines and it consists in the novel features hereinafter described and claimed.

An object of the invention is to provide a combined boot and shoe of simple and durable structure adapted to receive the grain from the grain tube or chute and direct the same into a furrow which is opened in the soil by the shoe. The shoe enters the soil for a sufficient depth to open a furrow, the bottom of which will lie in the damp and cool soil and when the seed is covered in the furrow the cool soil is thrown back upon the same and the warm or hot soil at the surface of the ground does not come in contact with the seed after it has been deposited in the furrow.

With this object in view the combined boot and shoe comprises a tubular member adapted to receive the seed and provided at its lower end portion with flared lugs upon which the shoe is mounted. The shoe consists of a steel plate having angularly disposed end portions and the said plate is attached by suitable securing devices to the lugs of the boot.

In the accompanying drawing:—

Figure 1 is a perspective view of the combined seeder boot and shoe.

Figure 2 is a transverse section looking downwardly and taken above the shoe.

As illustrated in the accompanying drawing the combined seeder boot and shoe comprises a tubular member 1 adapted to be applied to a seeding machine and adapted to receive the seed from the seed mechanism thereof. The lower end portion of the tubular member 1 is split and cut transversely, providing lugs 2 which are disposed at equal angles to each other and at the opposite sides of the tubular portion 1. The device also includes a shoe member 3 which is preferably made of carbon steel and is adapted to enter the soil and open a furrow therein. The shoe member 3 is provided with angularly disposed side portions and these side portions are secured to the lugs 2 by means of rivets 4 or other suitable securing devices. The blank from which the shoe member is formed is rectangular in plan before the blank is formed into the shoe.

When the device is applied to a seeder the tubular member 1 is disposed approximately vertically and above the surface of the soil. The lower portion of the shoe member 3 enters the soil and opens a furrow therein. The seed is permitted to fall through the tubular member 1 and enters the furrow behind the intermediate portion of the shoe and is covered in the furrow by suitable furrow closers (not shown) and which are usually carried by the seeding machine to which the device is applied.

Therefore it will be seen that the parts are so assembled and arranged that the shoe member 3 will open a deep furrow in the soil and consequently when the seed is deposited in the furrow it rests upon the comparatively cool and damp bottom thereof and is covered by the cool and damp soil which is thrown back over the seed and which was originally removed from the furrow that is opened by the shoe.

Therefore the seed comes in contact with the cool and damp soil only and is not brought in direct contact with the dry or burnt soil and consequently the sprouting and rooting of the seed is not retarded.

Having described the invention what is claimed is:

A device of the class described comprising a tube slit transversely and vertically to provide ears integral with it, said ears being bent to extend at an angle to each other, a shoe having angularly disposed blades, said tube resting on said blades intermediate the ears, said ears engaging the exterior of said blades, and means securing the ears to the blades.

In testimony whereof I affix my signature in presence of two witnesses.

MOSES CULBERTSON.

Witnesses:
 ERNEST LAYCOCK,
 MAX DRUB.